United States Patent [19]

Nonaka et al.

[11] Patent Number: 5,619,716

[45] Date of Patent: Apr. 8, 1997

[54] INFORMATION PROCESSING SYSTEM HAVING A CONFIGURATION MANAGEMENT SYSTEM FOR MANAGING THE SOFTWARE OF THE INFORMATION PROCESSING SYSTEM

[75] Inventors: Naomichi Nonaka, Kawasaki; Keiichi Nakane; Hiromichi Itoh, both of Yokohama; Hideaki Ishida, Kawasaki, all of Japan

[73] Assignee: Hitachi, Ltd., Tokyo, Japan

[21] Appl. No.: 466,238

[22] Filed: Jun. 6, 1995

Related U.S. Application Data

[63] Continuation of Ser. No. 971,566, Nov. 5, 1992, abandoned.

[30] Foreign Application Priority Data

Nov. 5, 1991 [JP] Japan .................................. 3-288808
Apr. 16, 1992 [JP] Japan .................................. 4-096278

[51] Int. Cl.⁶ .................................................. G06F 13/00
[52] U.S. Cl. ................ 395/800; 395/200.09; 395/200.1; 395/617; 395/651
[58] Field of Search ..................................... 395/800, 600, 395/700, 200.01; 364/DIG. 1, DIG. 2

[56] References Cited

U.S. PATENT DOCUMENTS

| | | | |
|---|---|---|---|
| 4,714,996 | 12/1987 | Gladney et al. | 364/300 |
| 4,823,261 | 4/1989 | Bank et al. | 364/DIG. 1 |
| 5,047,918 | 9/1991 | Schwartz et al. | 364/DIG. 1 |
| 5,155,847 | 10/1992 | Kirouac et al. | 395/600 |
| 5,247,683 | 9/1993 | Holmes et al. | 395/700 |
| 5,291,591 | 3/1994 | Kawano et al. | 395/600 |
| 5,495,610 | 2/1996 | Shing et al. | 395/600 |

OTHER PUBLICATIONS

Symborski, "*Updating Software and Configuration Data in a Distributed Network*", Proceedings of the Computer Networking Symposium, pp. 331–338, Apr. 11–13, 1988.

*Primary Examiner*—Alyssa H. Bowler
*Assistant Examiner*—Walter D. Davis
*Attorney, Agent, or Firm*—Antonelli, Terry, Stout & Kraus, LLP

[57] ABSTRACT

An information processing system in which update processes are automated in conformity with types of client machines, to thereby dispense with manual version update processes, and within which redirectors of identical version are run at any time, to thereby prevent any error ascribable to different programs from occurring. When a redirector stored in the client machine is started, it notifies version information of its own to a configuration management program stored in a server machine. In a case where version information of a redirector stored in a configuration management database is newer than the notified version information, the configuration management program sends an update request back to the redirector of the client machine and transfers the new redirector to the client machine so as to update the redirector thereof.

8 Claims, 17 Drawing Sheets

FIG.12

CONFIGURATION CONTROL FILE

ITEM NAME A = ITEM VALUE A
  ITEM NAME B = ITEM VALUE B
  ITEM NAME C = ITEM VALUE C
   ⋮      ⋮

FIG.13

EQUIPMENT STATUS DATABASE

| CLIENT TYPE | ITEM NAME | ITEM VALUE | ITEM ATTRIBUTE |
|---|---|---|---|
| 3010 | 3020 | 3030 | 3040 |
|  |  |  |  |
|  |  |  |  |
|  |  |  |  |
| ⋮ | ⋮ | ⋮ | ⋮ |

FIG.14

EQUIPMENT MODIFICATION PROCEDURE DATABASE

| CLIENT TYPE | ITEM NAME | PROCEDURE NAME |
|---|---|---|
| 4010 | 4020 | 4030 |
|  |  |  |
|  |  |  |
|  |  |  |
| ⋮ | ⋮ | ⋮ |

FIG.15

CONFIGURATION HISTORY DATABASE

| CLIENT IDENTIFIER | DATE OF STORAGE | DATE OF MODIFICATION | CONTENT OF CONFIGURATION FILE |
|---|---|---|---|
| 6010 | 6020 | 6030 | 6040 |
|  |  |  |  |
| ---- | ---- | ---- | ---- |
|  |  |  |  |

INFORMATION PROCESSING SYSTEM HAVING A CONFIGURATION MANAGEMENT SYSTEM FOR MANAGING THE SOFTWARE OF THE INFORMATION PROCESSING SYSTEM

This application is a continuation of application Ser. No. 07/971,566, filed on Nov. 5, 1992, now abandoned.

BACKGROUND OF THE INVENTION

The present invention relates to an information processing system, and more particularly to a configuration management system for the software of equipment. Here in this specification, the expression "configuration management" signifies to manage information based on the connectional relations, working status and operating environments of the constituents of a network system such as various computers, printers and circuits.

It is extensively practiced that a plurality of machines are connected through a network so as to permit one machine to utilize the resource of another machine. In a system thus constructed, the machine which offers the resource is called a "server" (or "server equipment"), while the machine which utilizes the resource is called a "client" (or "client equipment"). Heretofore, in the client/server system, a program called "redirector" has been located on the client side, and the requests of the client for accesses to the network have been processed by classifying the access requests into local and network requests by means of the redirector. Since the redirector is the program required for accessing the server, it cannot be located in the server, and this is the main reason for it being located in the client.

With the conventional technique, when updating the redirector, an update procedure needs to be executed in each individual client. This has led to the problem that much labor is expended in updating redirectors in a network system which has a large number of clients. Moreover, since the redirectors are manually updated, some of the redirectors are liable to not be updated. This has caused inconsistency of the whole system attributed to redirectors of different versions existing within the system. Especially in the presence of different types of clients, it has not been considered to update the redirectors in accordance with the types.

Meanwhile, the client is a machine which can also be used in a stand alone mode, and it can utilize both the resources of local resources peculiar to the particular client and remote resources including the server. Here, the expression "remote resources" is a general name to describe various resources such as the server, a shared disk storage and a shared printer, and the server is one of the remote resources.

In this regard, resource names which are used when each client utilizes the remote resources have been defined in the local resource of the client. Since the resource names are information required before connecting the client to the server etc., they need to be located in the client. When the remote resource management information differs for every client, the user of the system who has changed the client to-be-used might find themselves in the situation where, since a server resource name for accessing the server, for example, is different, a program used before is not operated without any modification. In order to avoid this drawback, an information server which unitarily manages the remote resource management information items of the respective clients is provided, and the clients obtain the remote resource management information items from the information server. In this way, under the mere condition that the clients store the resource name of the information server therein, the information items on the other remote resources can be managed in a unified fashion by the system.

With the above conventional technique, the remote resource management information items to be used by the clients are located in the information server and are accessed through the network.

On the other hand, however, local resource management information items which are required before the machines become accessible to the network, for example, when the power sources of the clients are turned ON, are not managed in the conventional system.

As another problem, since such local management information items are updated in the individual clients independently of one another, it has been very difficult to ascertain the history of the local management information items of all the clients.

The purpose of managing the history is, for example, to rectify the cause in the event of a fault. This operation is necessitated for a presumed situation as stated below.

In a case where a shared resource (for example, shared printer or shared modem) to which only one client is accessible at one time is to be used in the network system, the client needs to perform the so-called exclusion control of checking if any other client is using the shared resource and then bringing the shared resource into an "occupied" status if no other client is using this resource, before commencing use, and bringing the shared resource back into an "unoccupied" status after use.

Herein, when a certain client is to use the shared resource, it ought to run an AP (application program) which properly performs the exclusion control. Nevertheless, the user of the client is assumed not to hold such an AP and therefore to have unconditionally made the modification that the shared resource shall be brought into the "occupied" status at the start of the pertinent client's use of the resource irrespective of the actual status thereof, at their discretion without notifying the modification of the status to the manager of the system. Then, there arises the problem that, whereas the client having made the improper modification can utilize the shared resource, any other client properly performing the exclusion control cannot utilize the shared resource at all because of the continuous "occupied" status.

In such a case, since no trouble is indicated in the client actually causing the problem, the manager does not try to inspect the pertinent client. In any case, even when the manager inspects the malfunctioning client, they can never find the cause.

On this occasion, when the history of the modifications of the local resources of all the clients is stored, the modification of the configuration of the pertinent client can be confirmed to have been at the line of the malfunction of the other client, which greatly facilitates clearing up the cause of the malfunction.

SUMMARY OF THE INVENTION

An object of the present invention is to solve the problems stated above, and to provide an information processing system in which a first equipment such as a server can manage information necessary for and peculiar to a second equipment such as a client and can offer the managed information to the second equipment.

When the information to be dealt with is a particular version of information, update processes can be automated in accordance with the types of clients, and manual version update processes can be dispensed with. Besides, identical versions of the information are used in the system at any time, whereby any error ascribable to different version of programs can be prevented from occurring.

Moreover, when the information is used for permitting the server to manage local resources management information peculiar to the clients as located in the clients and programs for modifying the local resources, the operating environments (configuration information items) of all the clients are made the same, and the user of the system can similarly utilize the resource of the server at any client.

Another object of the present invention is to provide an information processing system in which the history of the modifications of local resources peculiar to clients as located in the clients is stored in a server, whereby the history of the management information of the whole system can be stored.

Further objects and features of the present invention will become apparent from the description of this specification.

For the above-mentioned object to automate the updating process, there is provided an information processing system having a plurality of equipments which are information processing equipments, the information processing system comprising:

a first equipment for providing a resource to any other equipments in the system and for storing information to be supplied to said any other equipments, a second equipment for utilizing the resource supplied by the first equipment and for receiving the information supplied by the first equipment, wherein the information to be supplied by the first equipment are a program which processes an access request from the second equipment to the resource of the first equipment, and a version of the program, and the information is provided according to the type of the second equipment, the second equipment including a first storing means for storing the program and the version of the program therein, the program transmitting version information stored in the first storage means to the first equipment, the first equipment comprising:

a second storing means for storing the program to be supplied to the second equipment according to the type of the second equipment, and the version of the program, a comparing means for comparing the version of the program stored in the second storage means with the version of the program transmitted from the second equipment according to the type of the second equipment, and providing the program and the version stored in the second storage means to the second equipment in the case that the version of the program stored in the second storage means is newer than that transmitted from the second equipment, and wherein the second equipment replaces an old version of the program with the new version.

As an example of the program as mentioned above, there is redirector which determines whether an access generated in the second equipment (for example, a client equipment) is to the server equipment or to the equipment within the client equipment, and transmits the request to the server equipment if the access request is directed to the selected equipment.

In the present invention, when the redirector recognizes the generation of the access request to the server, the version of the redirector is checked at first. If the version is old, the version is updated. At that stage, not all of the functions of the redirector are utilized. In short, only the minimum function of the redirector may be operated to transmit the latest redirector to the client. If the transmitting function of the redirector should have any problem in itself, the version of the redirector can be found to be old before the other operations are started. Therefore, all the updating is completed without fail.

In the processing method thus, explained, in which the director version is checked at first to ensure that the updating thereof is executed precedence to the other processing, the following problems can be solved.

When the version of the redirector is old, it suggests that there is a certain problem in the access process to the server (for if there is no problem updating is not necessary). Therefore, all the server access processes are not reliable at that time. In such a situation, it is only the redirector itself that can execute the updating thereof and other processing with the server equipment. The other programs are less reliable because it is not clear which process is used among the processes in the redirector, when they request an access to the server equipment. In view of the above, it is most desirable that the redirector executes updating process by itself.

After the completion of the connection to the server and when the process of the access request is started, the various function sin the director have already operated. So if the version of the redirector is found to be old (or to have any failure) at this stage, it cannot be ensured that the redirector is updated properly because it is now being used for communication with the server.

By checking the version of the director at the first stage of connection to the server equipment and updating the version if it is old, not all of the functions of the redirector are utilized at this stage. In short, only the minimum function of the redirector may be operated to transmit the latest redirector to the client for the updating. Also in the case that the transmission function of the redirector should have any problem in itself, the version of a the director can be found to be old before the other operations are started. Therefore, all the updating is completed without fail.

On the other hand, in the conventional art the updating of the version of the redirector was conducted as follows. The latest version is copied onto floppy disks to be distributed and the version is updated in the client equipment in the stand alone state (not being connected to the server equipment). Such a conventional way of the version updating was conducted manually by the user so it was time consuming. Still there is a problem that some of the client equipments might be left without being updated and it was not know to anybody.

Further, to manage the program for changing the information inherent to the second equipment, there is provided an information processing system having a plurality of equipments which are information processing equipments, the information processing system comprising;

a first equipment having information to be supplied to any other equipments in the system, a second equipment to which the information is provided by the first equipment, wherein the information to be supplied by the first equipment is configuration information as to the configuration of the second equipment and a program having a function to correct the configuration information, the second equipment comprising:

a first storing means for storing the configuration information and the program therein, a request means for requesting a connection to the first equipment, wherein the first equipment comprises;

a second storage means for string the configuration information to be supplied to the second equipment and the program therein, and a transmission means for transmitting the configuration information and the program stored in the second storage means to the second equipment in the case that the version of the configuration information stored in said first storage means is older than that stored in the second storage means, and wherein the program transmitted to the second equipment compares the configuration information transmitted from the first equipment with that stored in the first storing means, and corrects the configuration information to be stored in the first storing means based on the result of the comparison.

As a result, the local resource inherent to the second equipment stored in the second equipment can be managed by the first equipment. Further, as the program is transmitted to the second equipment an unexpected change of the configuration information can be coped with flexibly. As an example of such an unexpected change, the change of the configuration in the configuration information itself is considered.

In order to store the change history of the local resource, there is provided an information processing system, comprising:

the request means for requesting connection to the first equipment transmitting information indicative of the latest updating time of the configuration information stored in the first storing means to the first equipment, the first equipment comprising;

a determination means for determining whether the configuration of the second equipment is updated or not, based on the information thus transmitted which indicates the latest updating time thereof, and also based on the information indicating the latest updating time of the configuration information in the first equipment, and a history storing means for storing therein the latest configuration information as stored in the second equipment as history information of the second equipment when the determination means determines that the configuration of the second equipment was updated.

BRIEF DESCRIPTION OF THE DRAWINGS

FIG. 12 is a diagram showing the formation of a configuration control file which is stored in the second embodiment;

FIG. 13 is a diagram showing the organization of an equipment status database which is included in the second embodiment;

FIG. 14 is a diagram showing the organization of an equipment modification procedure database which is included in the second embodiment;

FIG. 15 is a diagram showing the organization of a configuration history database which is included in the second embodiment;

DESCRIPTION OF THE PREFERRED EMBODIMENTS

Figure 1:
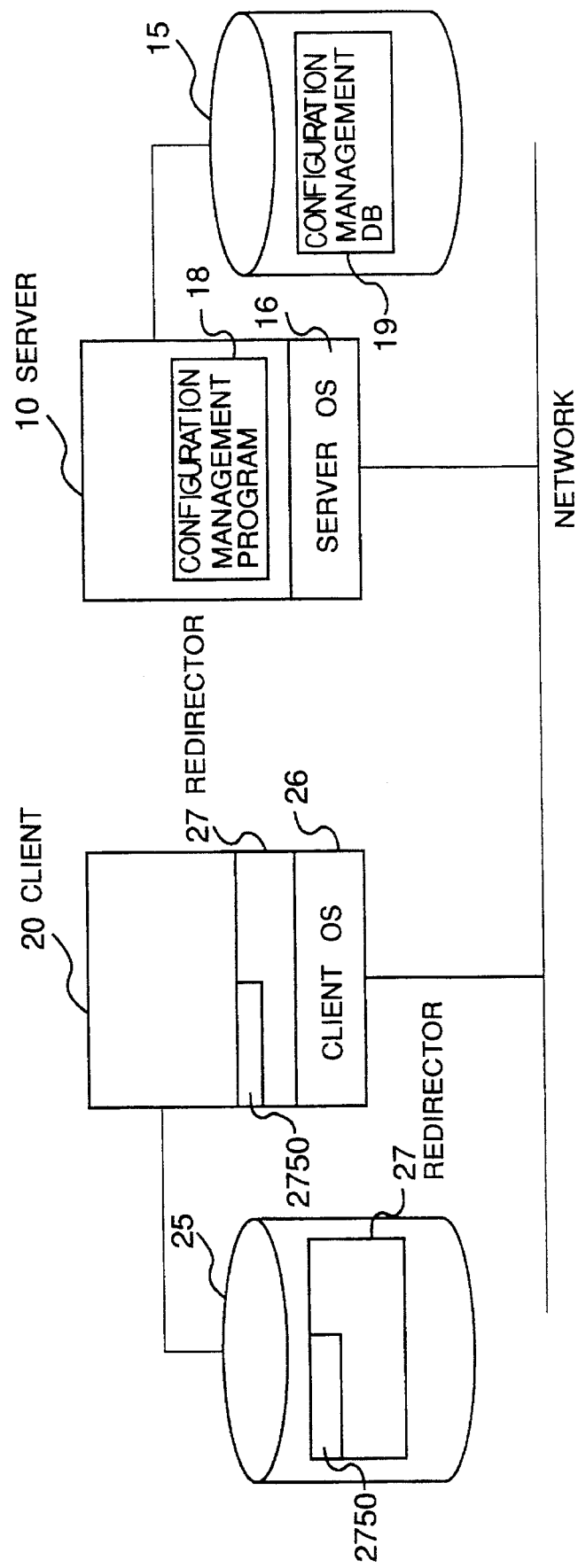
FIG. 1 is an architectural diagram of a client/server system in an embodiment of the present invention.

An embodiment of the present invention, in which a server manages information peculiar to a client and in which a process for updating the information is automated, will be described in conjunction with the drawings. FIG. 1 is a diagram showing the architecture of the system of this embodiment. The system is constructed comprising the server 10 and at least one client 20 which are connected through a network.

In the client/server system of this embodiment, a redirector (first means) 27 stored in the client (second equipment) 20 contains a data area for a version management table 2750 which managed the version No. of the redirector 27 itself (the data area is second means, and it shall be simply termed the "version management table" below), and a redirector 27 update routine which is executed at the start of the client. The server 10 (first equipment) stores a configuration management program 18 which controls the operation of updating a redirector 27 (the program is fourth means as configuration management means), and a storage area for a configuration management database 15 which stores the newest version of the redirector 27 therein (the database is third means as configuration management means, and it shall be simply termed the "configuration management database" below).

The version management table 2750 is one of the data structures owned by the redirector 27, and it stores a numerical value expressive of the version of the redirector 27 therein.

The redirector update routine communicates with a configuration management routine stored in the server 10, and it notifies the version of the corresponding redirector to the server side with reference to the version management table 2750. Then, when the version of the redirector 27 stored in the server 10 is newer than the notified version, the redirector update routine copies the newer redirector 27 from the server 10 so as to update the redirector of the client into the newest version.

The configuration management routine stored in the server 10 has a copy of the redirector 27. In response to an inquiry made by the redirector update routine on the client 20 side, the configuration management routine compares the notified version with the version of its own redirector 27 and sends the result of the comparison back to the client 20 side. The management routine transfers the redirector 27 under its management to the client 20 side when the update routine has made a copy request.

Since the client and the server operate in this manner, the newest redirector is always located in the client, and the user of the client/server system is freed from manually updating the version of the redirector.

Figure 7:
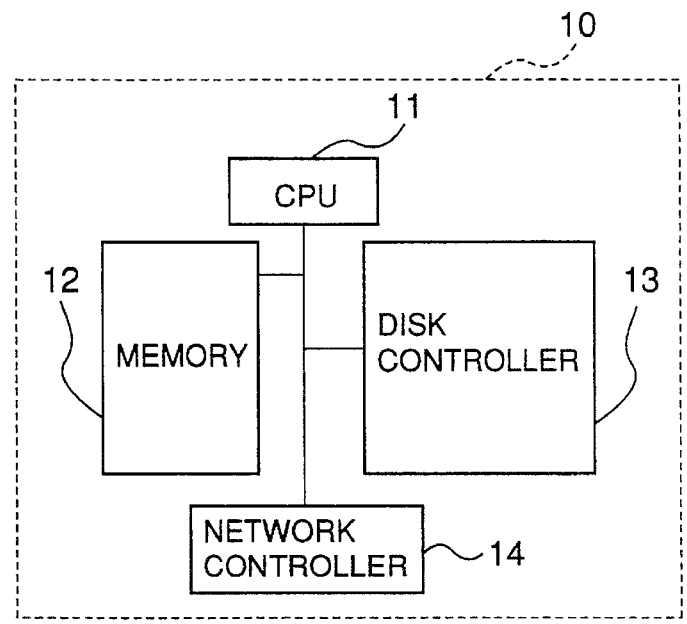
FIG. 7 is a block diagram of a server which constitutes the embodiment.

As illustrated in FIG. 7, the server 10 is configured of a CPU (central. processing unit) 11, a memory 12, a disk controller 13 and a network controller 14. Also, it is furnished with a disk storage 15 as shown in FIG. 1. The CPU 11 controls the entire server 10. The memory 12 stores programs and data therein. The disk controller 13 controls the disk storage 15. The network controller 14 controls the access of the server 10 to the network. The disk storage 15 stores programs and data therein.

Figure 8:
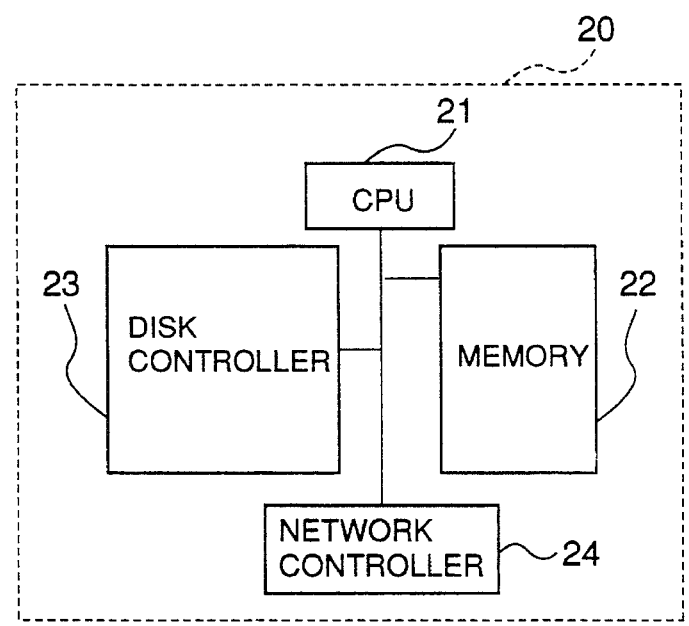
FIG. 8 is a block diagram of a client which constitutes the embodiment.

As illustrated in FIG. 8, the client 20 is configured of a CPU 21, a memory 22, a disk controller 23 and a network controller 24 likewise to the server 10. The functions of the elements 21~24 are the same as those of the elements 11~14, respectively. In this embodiment, the client 20 is furnished with a disk storage 25 as shown in FIG. 1. Although only one client is depicted in FIG. 1, the present invention is applicable quite similarly even in the presence of a plurality of clients.

Referring to FIG. 1, a server OS (operating system) 16 is run in the server 10. The server OS 16 is a program which is located in the memory 12, and which controls the operation of the whole server 10.

The server 10 and the client 20 need not be machines of identical construction. On the contrary, even when they have an identical construction, no problem is posed.

In the client 20, a client OS 26 is similarly run to control the operation of the entire client 20.

The redirector 27 is also run in the client 20. This redirector 27 is a program which functions to divide access requests made by the other programs of the client 20, into requests to the network and ones to local resources. The processing contents of the redirector 27 will be explained later.

The configuration management program 18 is run in the server 10. This configuration management program 18 communicates with the redirector 27 stored in the client 20, through the network so as to manage the version of the redirector 27. Besides, the configuration management database 19 is located in the disk storage 15. This configuration management database 19 is used for storing the newest version of the redirector 27 therein. The details of the configuration management program 18 and the configuration management database 19 will be explained later.

Next, the processing contents of the redirector 27 will be explained.

Figure 3:
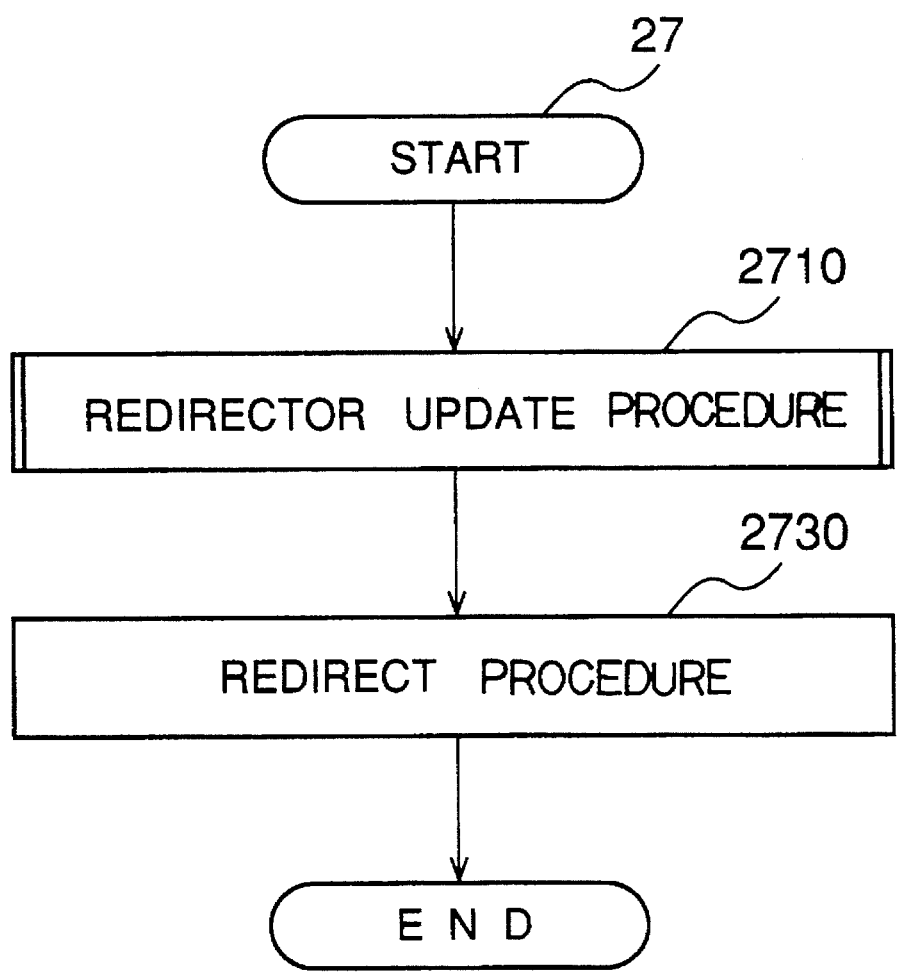
FIG. 3 is a flow chart of the redirector.

FIG. 3 illustrates the flow chart of the redirector 27. First, a redirector update procedure 2710 is executed at a step 2710. Subsequently, a redirect procedure is executed at a step 2730.

The redirector update procedure 2710 is a process which communicates with the server 10 so as to acquire the newest version of the redirector 27. The details of this process will be explained later.

The redirect procedure 2730 is the original operation of the redirector 27 for dividing access requests into network requests and local requests. Since this operation is a well-known technique, it shall be omitted from detailed description.

Figure 4:
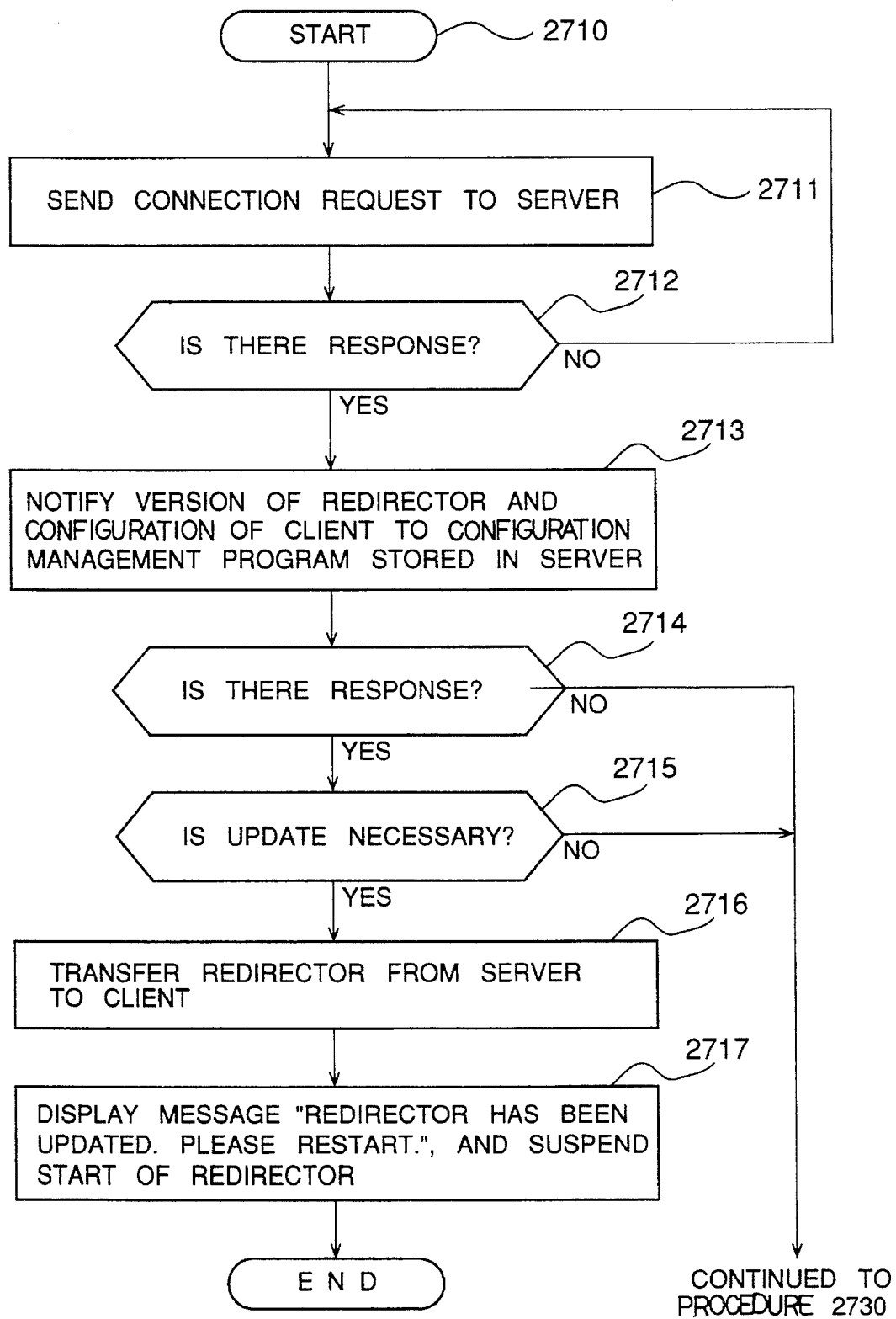
FIG. 4 is a flow chart showing a redirector update process which is contained in the redirector.

FIG. 4 illustrates the flow chart of the redirector update procedure 2710.

In the redirector update procedure 2710, a request for connection is sent to the server 10 at a step 2711, whereupon a response is awaited. Whether or not the response is received within a predetermined time period, is decided at a step 2712, which is followed by a step 2713 subject to the receipt of the response. When the response is not received, the routine returns to the step 2711. Thus, the connection request is iterated until the response is received.

When the client 20 has been connected, the redirector 27 notifies the version of this redirector and the configuration information of the client 20 to the configuration management program 18 stored in the server 10, at the step 2713. Here, the version of the redirector 27 is obtained by referring to the content of the version management table 2750. In addition, the configuration information of the client 20 is information which is acquired from the client OS 26. More concretely, it contains the hardware type of the client 20 and the version information of the client OS 26.

Subsequently, if there is a response within a predetermined time period is decided at a step 2714. In the absence of the response, the redirector update procedure 2710 is ended to execute the redirect procedure 2730. On the other hand, in the presence of the response, the routine proceeds to a step 2715, at which the content of the response is checked. When the content of the response is "update necessary" the routine proceeds to a step 2716, and when not, the redirector update procedure 2710 is ended to execute the redirect procedure 2730.

When the update operation is necessary, the newest version of the redirector 27 is transferred from the server 10 and is stored in the disk storage 25 at the step 2716. Subsequently, the routine proceeds to a step 2717, at which a message having contents: "Redirector has been updated. Please restart." is displayed. Then, the process of the redirector 27 is ended.

Next, the processing contents of the configuration management program 18 will be explained.

Figure 5:
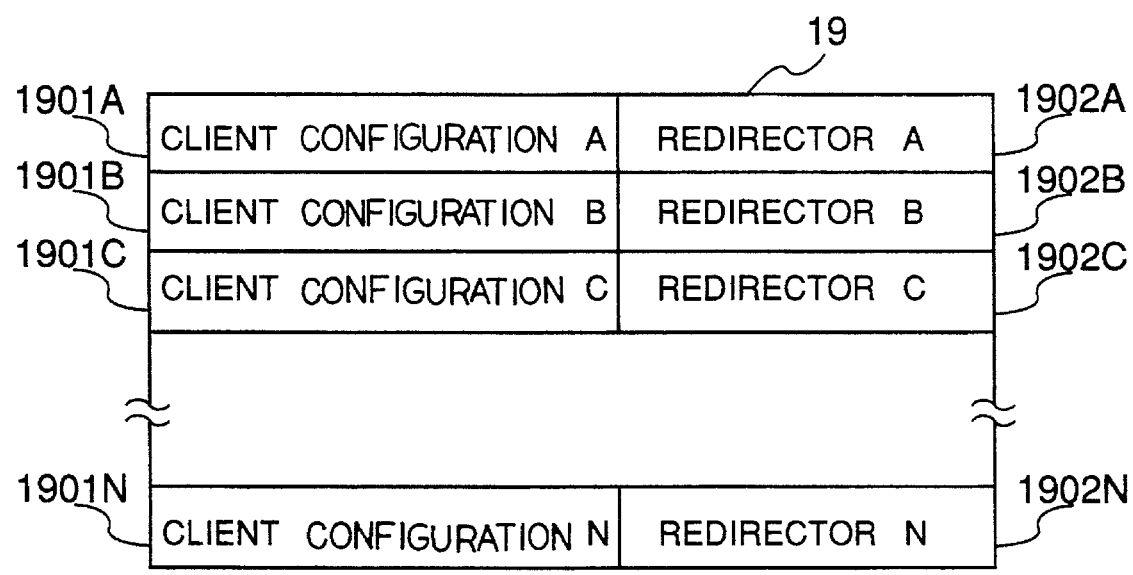
FIG. 5 is a diagram showing the organization of a configuration management database which is included in the embodiment.

FIG. 5 is a diagram showing the organization of the configuration management database 19. This configuration management database 19 is formed of any desired number of configuration data fields 1901A~1901N and program fields 1902A~1902N arranged in pairs. The configuration information items of the clients 20 are stored in the configuration data fields 1901A~1901N, while the newest redirector programs corresponding to the configurations of these clients are stored in the program fields 1902A~1902N.

Figure 6:
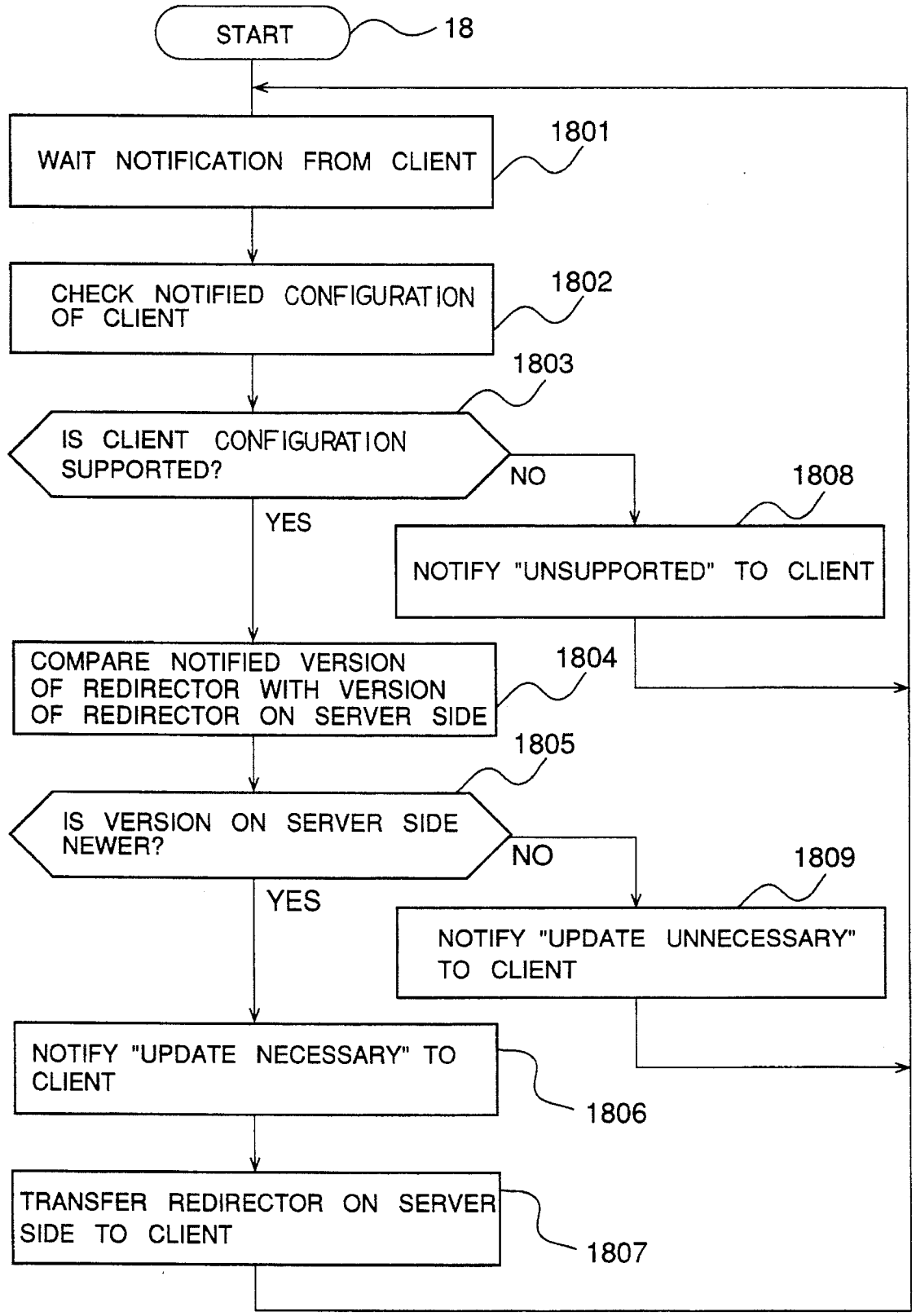
FIG. 6 is a flow chart of a configuration management program which is stored in the embodiment.

FIG. 6 is the flow chart of the configuration management program 18. In this configuration management program 18, a notification from the client 20 is awaited at a step 1801.

Upon receiving the notification, the routine proceeds to a step 1802, at which the notified configuration information is compared with the contents of the configuration data fields 1901A–1901N of the configuration management database 19, to thereby check if a coincident field containing the same configuration exists. The result of the check is decided at a step 1803. When the coincident field exists, the routine proceeds to a step 1804, and when not, it proceeds to a step 1808.

When the coincident field does not exist, a reply "unsupported" is notified to the client 20 at the step 1808, from which the routine returns to the step 1801 so as to await the next notification.

In contrast, when the coincident field exist's, the step 1804 functions to compare the notified version of the redirector 27 of the client 20 with the content of the version management table 2750 contained in the redirector 27 which is stored in the program field (any of 1902A–1902N) corresponding to the coincident one of the configuration data fields 1901A–1901N (hereinafter, this redirector shall be shortly termed the "corresponding redirector"). Subsequently, the result of the comparison is decided at a step 1805. Herein, when the version of the redirector 27 in the server is newer, the routine proceeds to a step 1806, and when not, it proceeds to a step 1809.

At the step 1809, a reply "update unnecessary" is notified to the client 20. Thereafter, the routine returns to the step 1801 so as to await the next notification from the client 20.

When the corresponding redirector 27 in the server is newer, a reply "update necessary" is notified to the client 20 at the step 1806, and the corresponding redirector 27 is transferred to the client 20 at a step 1807. Thereafter, the routine returns to the step 1801 so as to await the next notification.

As thus far described, in this embodiment, whenever the redirector 27 in the client 20 is to be connected to the server 10, it checks whether or not its own version is the newest, and the redirect or 27 of the newest version is automatically transferred from the server 10 to the client when the version of the redirector 27 in the client 20 is not the newest. This makes it possible to utilize the redirector 27 of the newest version at any time, without troubling the user of the system. Meanwhile, in a case where the redirectors 27 have been modified, the newest versions thereof may be registered only in the configuration management database 19 stored in the server 10, and the need to execute the update processes for the individual clients 20 is dispensed with. Therefore, the burden of the manager of the network system is substantially relieved.

In this manner, according to the first embodiment, the process for updating the redirector which needs to be located on the client side for use in the connection to the network is automatically executed through the network, so that the burden of the manager of the network system does not change even in the case of an increase in the number of clients, and the users of the clients need not perform version update processes. Moreover, the redirectors of identical versions are used in the network system at any time, so that the operation of the network system is much less liable to become unstable on account of the use of different network programs.

Now, the second embodiment of the present invention will be described with reference to the drawings. This embodiment, which is provided in an information processing system having local resources peculiar to second equipment (clients), manages the local rescources by a first equipment (a server), and stores the history of the local resources in the server.

Figure 9:
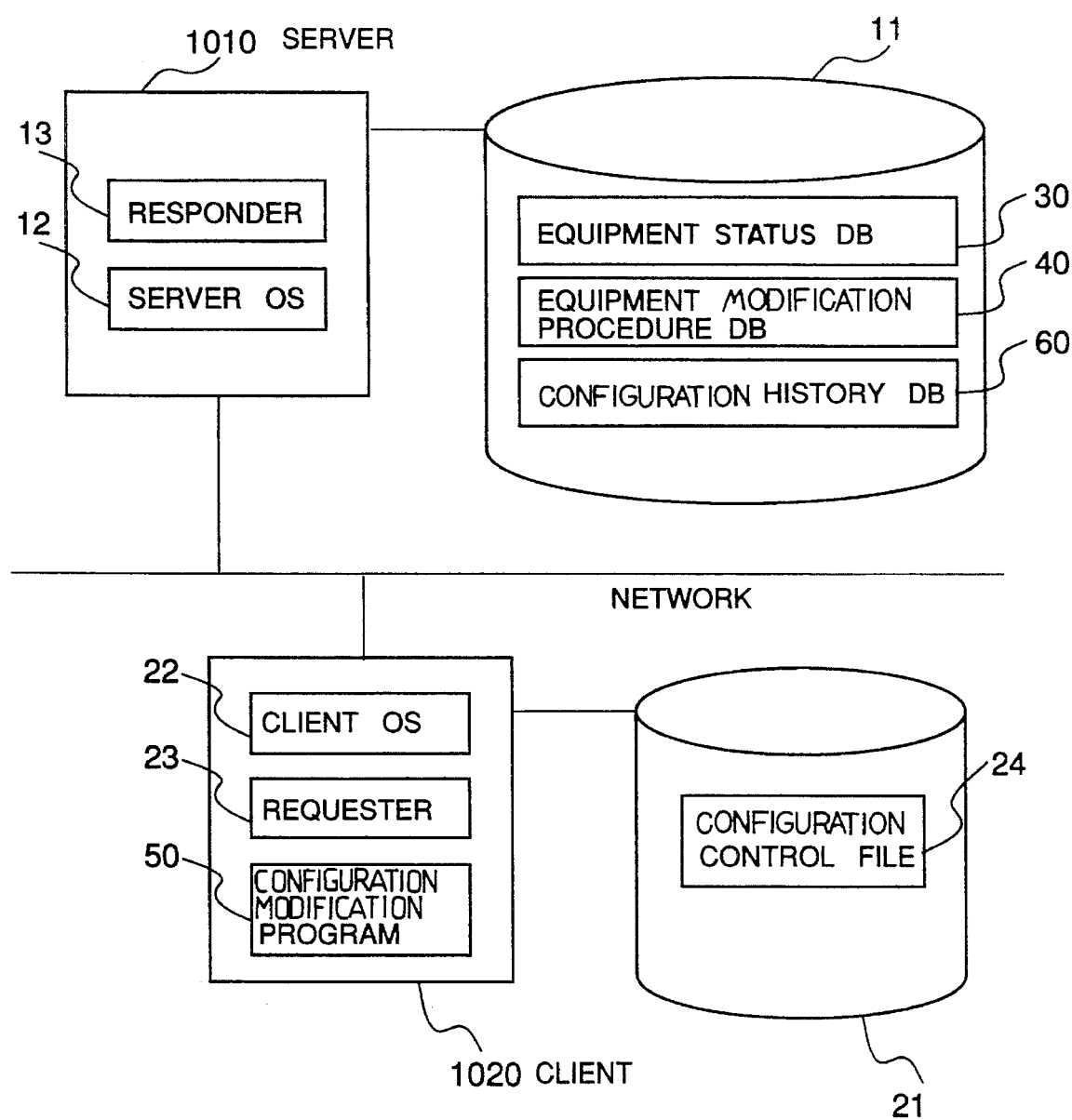
FIG. 9 is an architectural diagram of a client/server system in the second embodiment of the present invention.

FIG. 9 is a diagram showing the architecture of the system of this embodiment. The system is constructed comprising the server 1010 and at least one client 1020 which are connected through a network.

Figure 10:
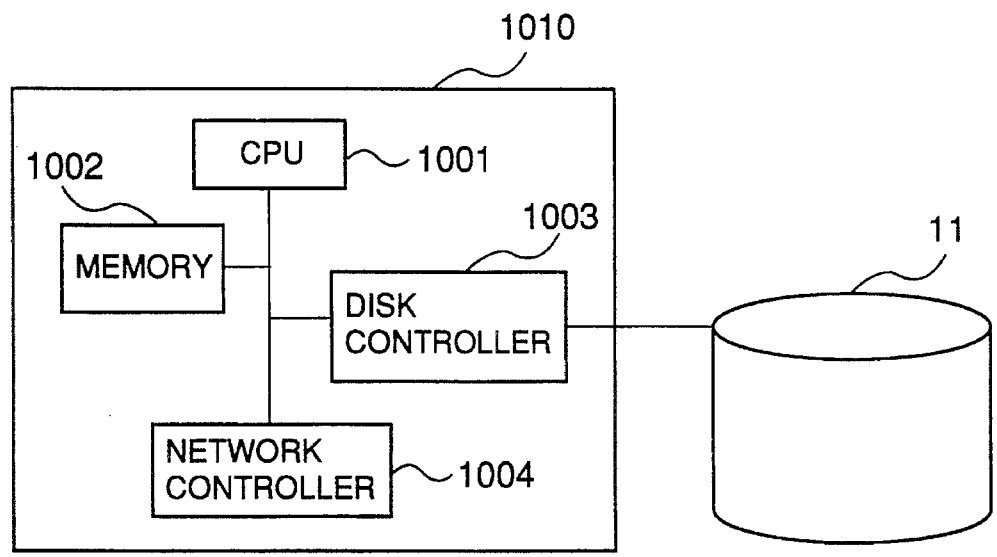
FIG. 10 is a block diagram of a server which constitutes the second embodiment.

As illustrated in FIG. 10, the server 1010 is configured of a CPU (central processing unit) 1001, a memory 1002, a disk controller 1003 and a network controller 1004. Also, it is furnished with a server disk storage 11. The CPU 1001 controls the entire server 1010. The memory 1002 stores programs and data therein. The disk controller 1003 controls the server disk storage 11. The network controller 1004 controls the access of the server 1010 to the network. The server disk storage 11 stores programs and data therein.

Figure 11:
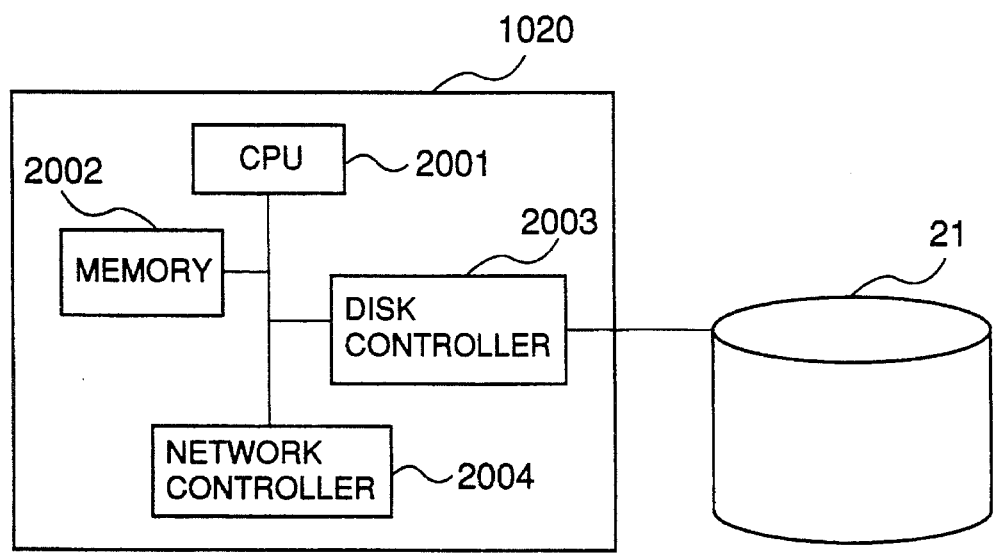
FIG. 11 is a block diagram of a client which constitutes the second embodiment.

As illustrated in FIG. 11, the client 1020 is configured of a CPU 2001, a memory 2002, a disk controller 2003 and a network controller 2004 likewise to the server 1010. Also, it is furnished with a client disk storage 21. The functions of the elements 2001–2004 and 21 are the same as those of the elements 1001–1004 and 11, respectively. Although only one client is depicted in FIG. 9, the present invention is applicable quite similarly even in the presence of a plurality of clients.

Referring to FIG. 9 again, a server OS (operating system) 12 which controls the entire server 1010 is run in the server 1010. In the client 1020, a client OS 22 which controls the whole client 1020 is similarly run. Incidentally, the server 1010 and the client 1020 need not be machines of identical construction. On the contrary, even when they have identical construction, no problem is posed.

A requester 23 (sixth and eleventh means) is also run in the client 1020. This requester 23 is a program which processes requests for accesses from the other programs of the client 1020 to the server 1010. The processing contents of the requester 23 will be explained later. A storage area for a configuration control file 24 (the storage area is fifth means, and it shall be simply termed the "configuration control file" below) is located in the client disk storage 21. The configuration of the client 1020 is stated in the configuration control file 24. When the client 1020 has been started, the client OS 22 loads the contents of the configuration control file 24 and determines the configuration of the client 1020 in accordance with the loaded contents.

An example of the formation of the configuration control file 24 is shown in FIG. 12. In this configuration control file 24, set values for the respective items of the configuration are stated in the form of "Item name=Item value". The items of the configuration include, for example, the size of a file buffer, the driver of a device, and the name of a network drive.

A responder 13 (seventh and twelfth means) is also run in the server 1010. This responder 13 communicates with the requester 23 running in the client 1020, through the network, to thereby manage the configuration of the client 1020.

Located in the server disk storage 11 are a storage area for an equipment status database 30 (the storage area is eighth means, and it shall be simply termed the "equipment status database" below), a storage area for an equipment modification procedure database 40 (the storage area is tenth means, and it shall be simply termed the "equipment modification procedure database" below), and a storage area for a configuration history database 60 (the storage area is thirteenth means, and it shall be simply termed the "configuration history database" below). The equipment status database 30 stores the configuration information of the client 1020 therein, while the equipment modification procedure database 40 stores therein a configuration modification program 50 (ninth means) which is run in the client 1020. Besides, the configuration history database 60 stores therein the history of the past modification contents of the configuration control file 24 which is stored by the client 1020.

FIG. 13 illustrates an example of the organization of the equipment status database 30. This equipment status database 30 contains a client type field 3010, an item name field 3020, an item value field 3030 and an item attribute field 3040. It is configured of any desired number of entries in each of which the values of the fields form a set. The entries indicate values to be assumed by the item names in the configuration control file 24, and attribute values concerning modification methods, for the individual types of clients 1020. The item attribute field 3040 contains any of three values for a forcible modification, an inquiry and a warning, which are different processes. The forcible modification indicates to unconditionally modify the set value of the client 1020 to the value of the item value field 3030 of the equipment status database 30. In addition, the inquiry indicates to modify the above set value on condition that the modification is granted by inquiring of the user of the client 1020. The warning indicates to merely give warning to the user without modifying the aforementioned value.

Incidentally, the equipment status database 30 is updated by the manager of the server 1010 (who is usually the manager of the whole system).

The update operations are performed when the equipment configuration of the server 1010 has been changed, when shared resources have been changed (such as the addition of a shared printer), when the version of the client OS 22 has been renewed, when application software has been newly introduced or has had its version renewed, when a measure against a fault has been taken, and so forth.

FIG. 14 illustrates an example of the organization of the equipment modification procedure database 40. This equipment modification procedure database 40 contains a client type field 4010, an item name field 4020 and a procedure name field 4030. It is configured of any desired number of entries in each of which the values of the fields form a set. The entries hold modification methods for the values of the items in the configuration control file 24, for the individual types of clients 1020. The client type field 4010 and the item name field 4020 store therein the values which correspond to the client type field 3010 and the item name field 3020 contained in the equipment status database 30, respectively. On the other hand, the procedure name field 4030 stores the configuration modification program 50 therein.

FIG. 15 illustrates an example of the organization of the configuration history database 60. This configuration history database 60 contains a client identifier field 6010, a storing date field 6020, an modified date field 6030 and a configuration file content field 6040. It is configured of any desired number of entries in each of which the values of the fields form a set. The client identifier field 6010 stores therein any of client identifiers which are values for uniquely identifying the individual clients 1020. The storing date field 6020 indicates the date at when the contents of the configuration control file 24 were stored in the configuration history database 60, while the modified date field 6030 indicates the date when the stored configuration control file 24 was last modified. The configuration file content field 6040 stores the contents of the configuration control file 24 therein.

Each of the entries stores therein the values of the configuration control file 24 of the client 1020 at a certain point of time. Accordingly, each group consisting of entries whose client identifiers have the same value expresses the history of the modifications of the configuration of the corresponding client 1020.

Next, the processing contents of the requester 23 and the responder 13 will be explained.

Figure 16:
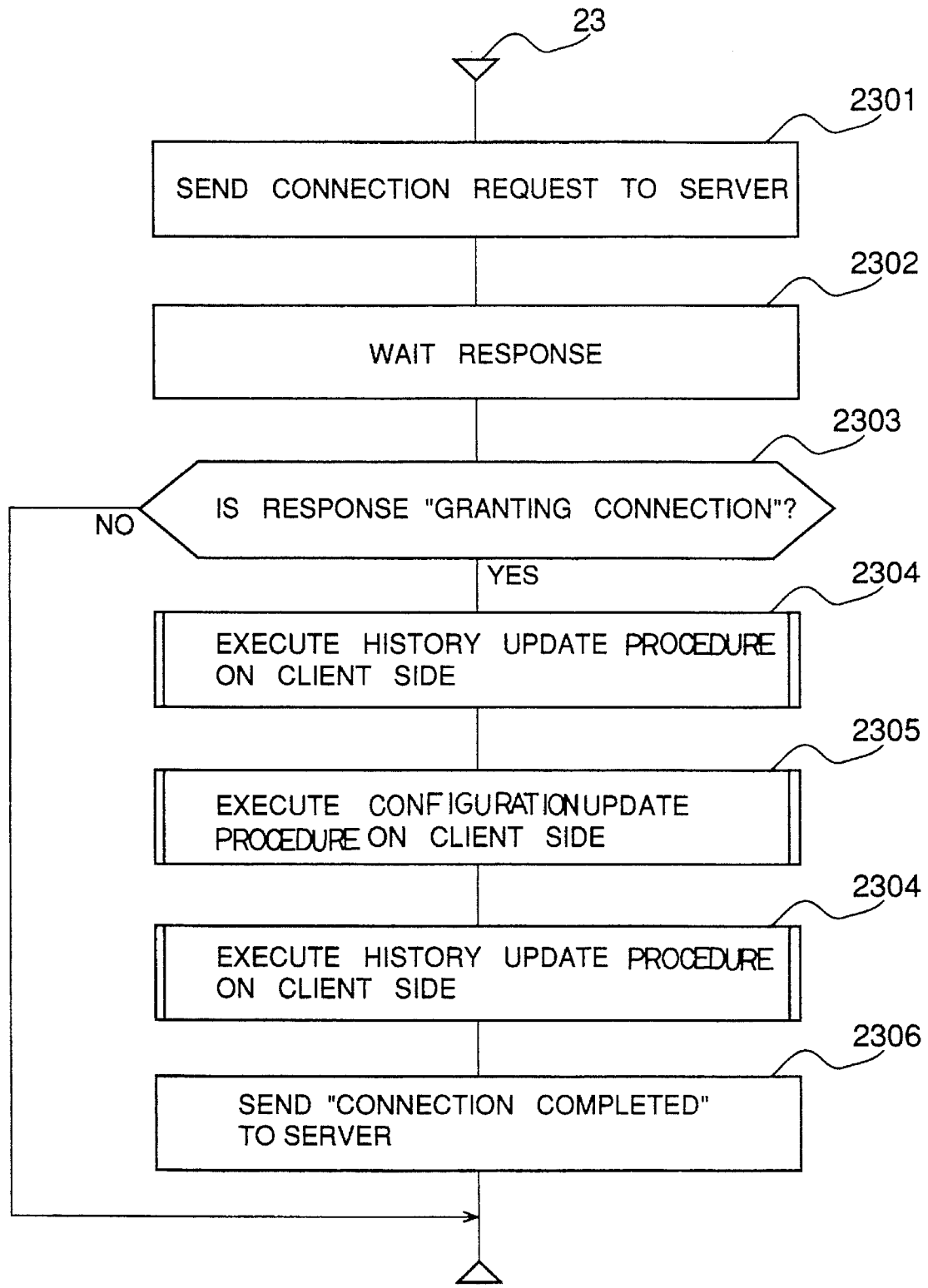
FIG. 16 is a flow chart of a requester which is stored in the second embodiment.

FIG. 16 is the flow chart of the requester 23. The requester 23 sends a connection request to the server 1010 at a step 2301. The connection request is sent containing the client identifier and the client type. Subsequently, a response from the server 1010 is awaited at a step 2302. Upon receiving the response, the requester 23 proceeds to a step 2303, at which the content of the response is checked. When the content is "granting connection", the routine proceeds to a step 2304, and when not, the process of the requester 23 is ended as a connection failure.

A history update process on the client side is executed at the step 2304, a configuration update procedure on the client side is executed at the succeeding step 2305, and the client-side history update procedure 2304 is executed again. Here, the configuration update process is executed when the client 1020 is to be connected to the server 1010. Incidentally, the configuration information stored by the client 1020 is updated in some cases. The automatic update operation based on the configuration update process according to the present invention corresponds to one of the cases. The other cases include occasions where an equipment or a resource has been newly introduced, where new software has been installed, where the equipment configuration has been modified (for example, a memory has been added), where a measure against a fault has been taken, and so forth. At the final step 2306 of the requester 23, a message "connection completed" is notified to the server 1010, and the process of the requester 23 is ended as a connection success.

The contents of the client-side history update procedure 2304 and the the client-side configuration update procedure 2305 will be explained later. The client-side history update procedure 2304 is executed twice in the requester 23. The first history update process is executed for leaving the history of any modification which might have been made by the user before the connection, while the second history update process is done for leaving the history of an modification which is based on the directly-preceding configuration update process.

Figure 17:
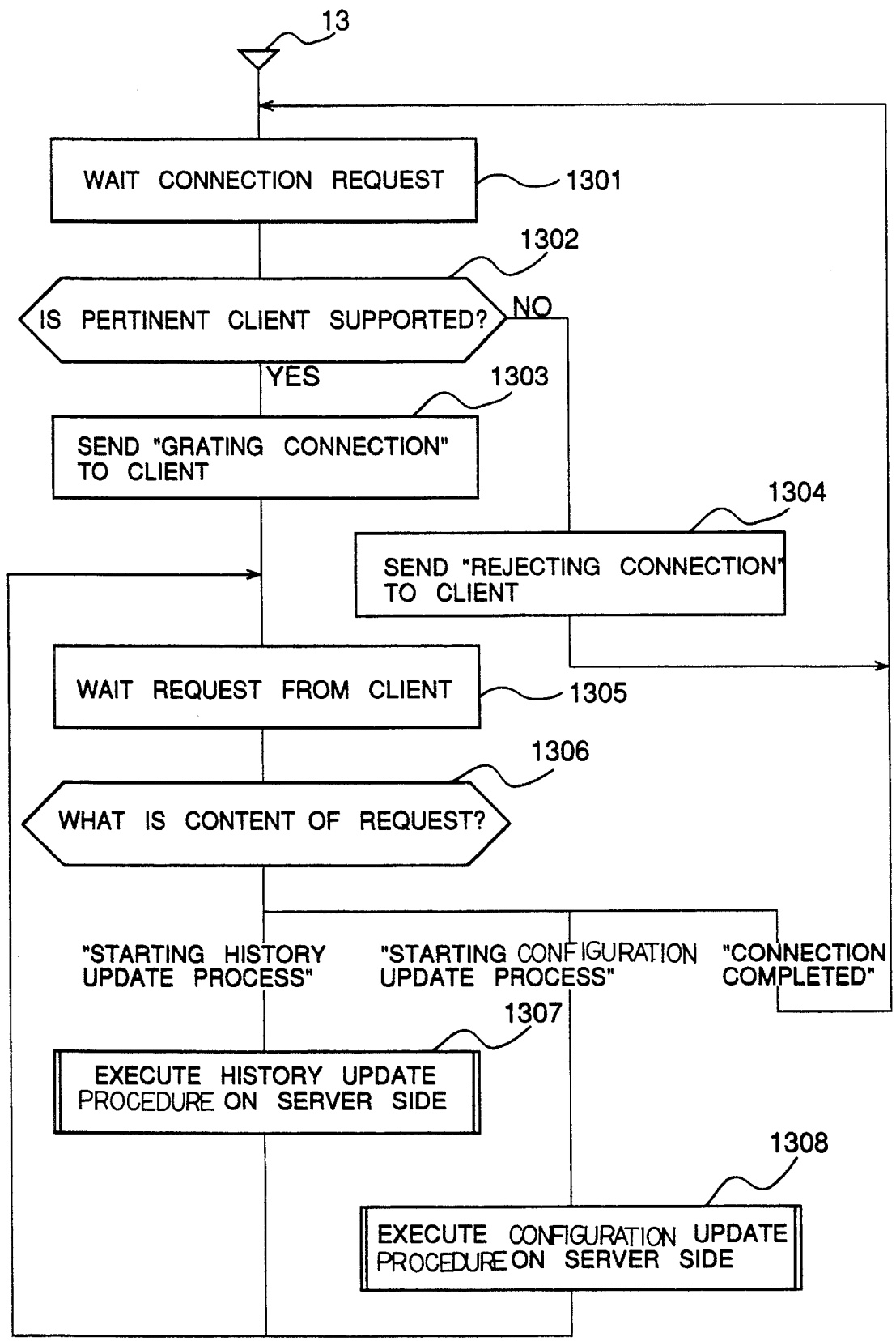
FIG. 17 is a flow chart of a responder which is stored in the second embodiment.

FIG. 17 illustrates the flow chart of the responder 13. The responder 13 awaits a connection request from the client 1020 at a step 1301. Upon receiving the connection request, the responder 13 proceeds to a step 1302, at which the content of the connection request is checked. In a case where the connection request is not accepted, the routine proceeds to a step 1304, at which a reply "rejecting connection" is sent back to the client 1020. Thereafter, the routine returns to the step 1301 so as to await the next connection request.

On the other hand, in a case where the connection request is accepted, the routine proceeds to a step 1303, at which a reply "granting connection" is sent back to the client 1020. Subsequently, the routine proceeds to a step 1305 so as to await a request from the client 1020. Upon receiving the request, the routine proceeds to a step 1306, at which the content of the request is examined so as to decide to proceed to a corresponding one of steps 1307 etc. to be stated below. In a case where the request content is "starting history update process", the step 1306 is followed by the step 1307, at which a history update process on the server side is executed. After the end of this process, the routine returns to the step 1305 so as to await the next request.

Besides, in a case where the request content is "starting configuration update process", the step 1306 is process on the server side is executed. After the end of this process, the routine returns to the step 1305 so as to await the next request. Further, in a case where the request content is "connection completed", the process of connection from the pertinent client 1020 has been completed. Therefore, the routine returns to the step 1301 so as to await a connection request again. Incidentally, the contents of the server-side history update process and the server-side configuration update process will be explained later.

Next, the contents of the history update processes on the client side and on the server side will be explained.

Figure 18:
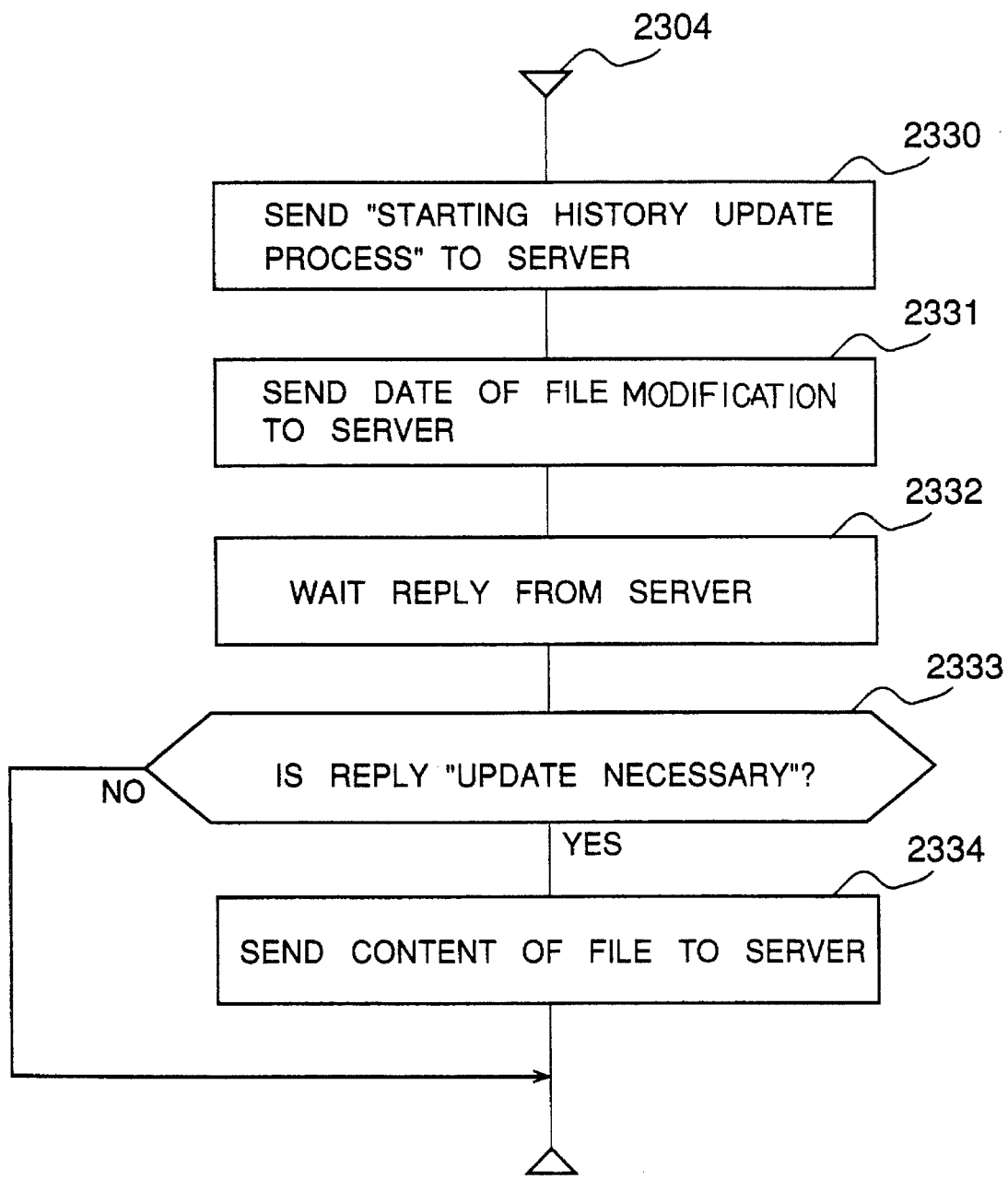
FIG. 18 is a flow chart showing a client-side history update process which is contained in the requester.

FIG. 18 illustrates the flow chart of the client-side history update procedure 2304. In this client-side history update procedure 2304, a message "starting history update process" is sent to the server 1010 at a step 2330. Subsequently, the file modification date of the configuration control file 24 stored in the client 1020 is sent to the server 1010 at a step 2331, and a reply from the server 1010 is awaited at a step 2332. Upon receiving the reply, the routine proceeds to a step 2333, at which the content of the reply is checked. When the reply is "update unnecessary", the client-side history update procedure 2304 is ended. In contrast, when the reply is "update necessary", the routine proceeds to a step 2334, at which the requester 23 sends the content of the configuration control file 24 to the server 1010 and asks the server 1010 to register the sent content in the configuration history database 60. Then, the client-side history update procedure 2304 is ended.

Figure 19:
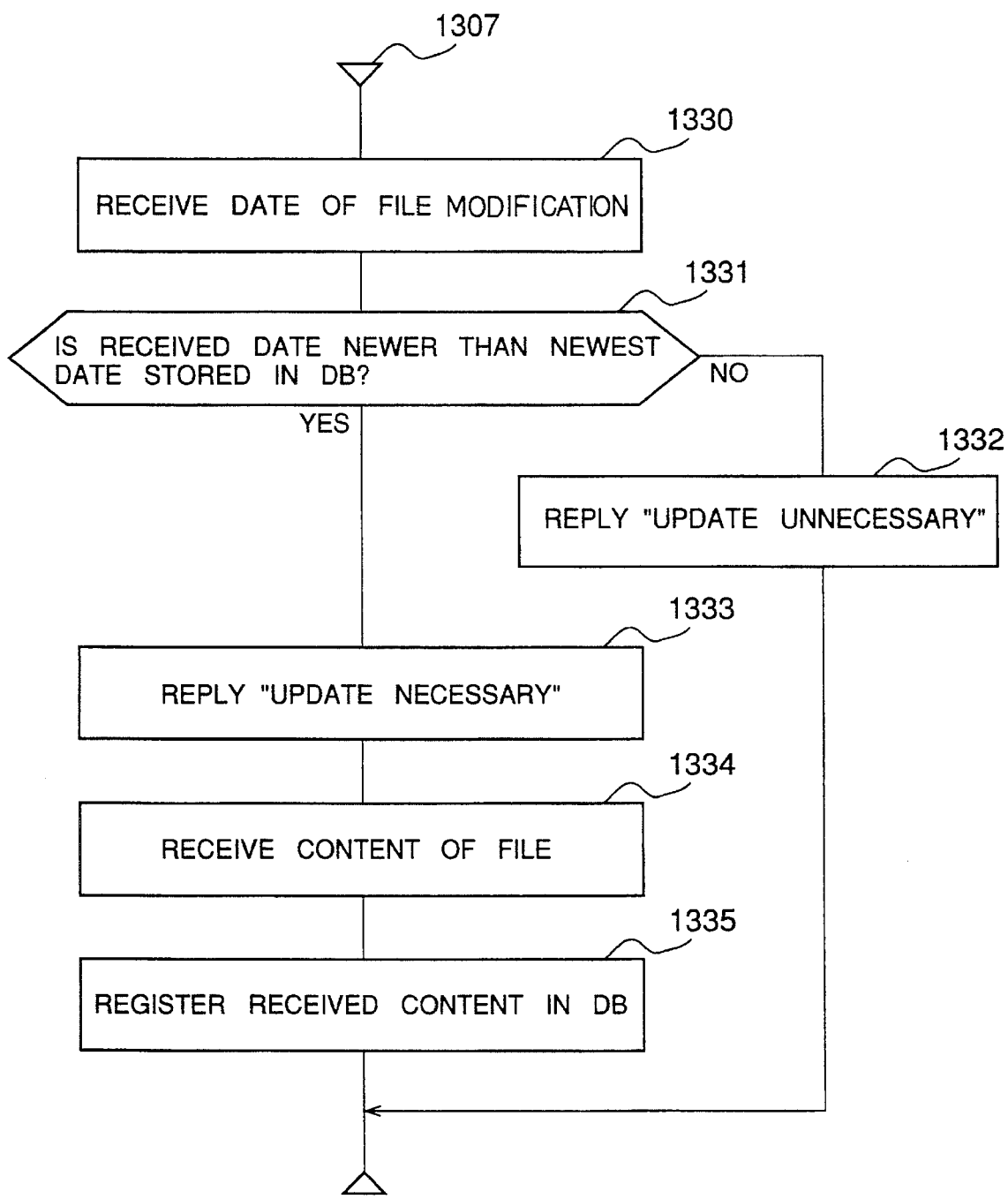
FIG. 19 is a flow chart showing a server-side history update process which is contained in the responder.

FIG. 19 is the flow chart of the server-side history update process 1307. In this server-side history update process 1307, the file modification date of the configuration control file 24 sent at the step 2331 on the client side is received at a step 1330. At the succeeding step 1331, the sent file modification date is compared with the newest one of the values of the file modified date fields 6030 of the corresponding entries stored in the configuration history database 60. Herein, when the sent date is newer, the routine proceeds to a step 1333, and when not, the routine proceeds to a step 1332. In the above, the expression "corresponding entries" signifies the entries whose client identifier fields 6010 have the same value as that of the client identifier of the client 1020 sent at the request for connection. At the step 1332, a reply "update unnecessary" is sent to the client 1020 because the content of the configuration history database 60 need not be updated. Then, the server-side history update process 1307 is ended. On the other hand, at the step 1333, a reply "update necessary" is sent to the client 1020. Subsequently, the content of the configuration control file 24 sent at the step 2334 on the client side is received at a step 1334. Thereafter, the responder 13 registers the received content in the configuration history database 60 at a step 1335. Then, the server-side history update process 1307 is ended. Incidentally, the registration is done by adding a new entry, not by changing the content of any existent entry.

Next, the contents of the configuration update processes on the client side and on the server side will be explained.

Figure 20:
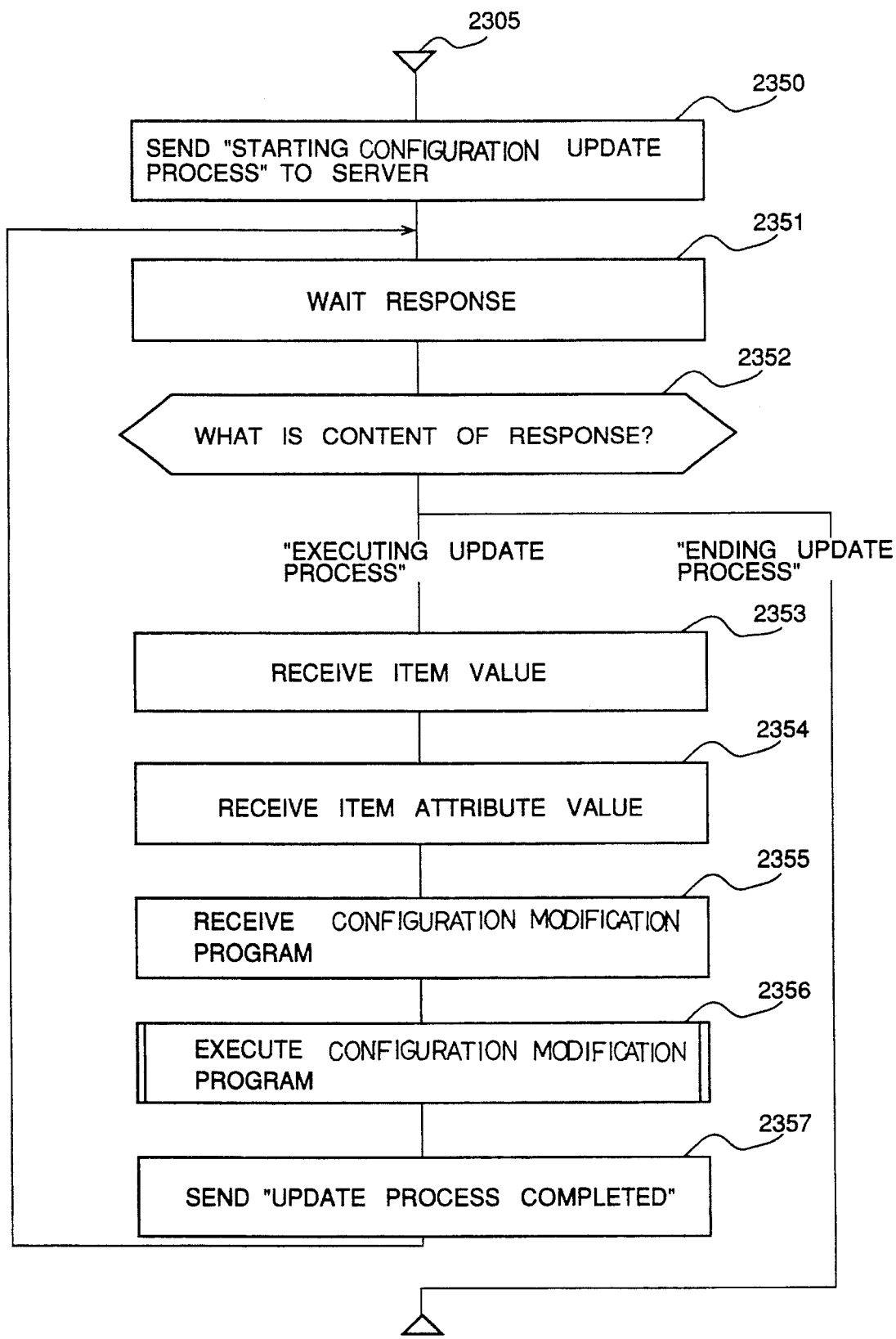
FIG. 20 is a flow chart showing a client-side configuration update process which is contained in the requester.

FIG. 20 is the flow chart of the client-side configuration update procedure 2305. In this client-side configuration update procedure 2305, a message "starting configuration update process" is sent to the server 1010 at a step 2350, and a response from the server 1010 is awaited at a step 2351. Upon receiving the response, the requester 23 proceeds to a step 2352, at which the content of the response is checked. When the response is "ending update process", the client-side configuration update procedure 2305 is immediately ended. On the other hand, when the response is "executing update process", the routine proceeds to a step 2353 so as to receive the set item value 3030 of the equipment status database 30 from the server 1010, and it proceeds to a step 2354 so as to receive the item attribute value 3040. Subsequently, at a step 2355, the configuration modification program 50 is similarly received from the server 1010, and at a step 2356, the received configuration modification program 50 is executed in such a way that the set item value and the item attribute value received before are used as parameters. The contents of the configuration modification program 50 will be explained later. When the configuration modification program 50 has been executed, the routine proceeds to a step 2357, at which a message "update process completed" is sent to the server 1010, to thereby end the operation of updating the pertinent configuration item. Then, the routine returns to the step 2351 so as to await a response again.

Figure 21:
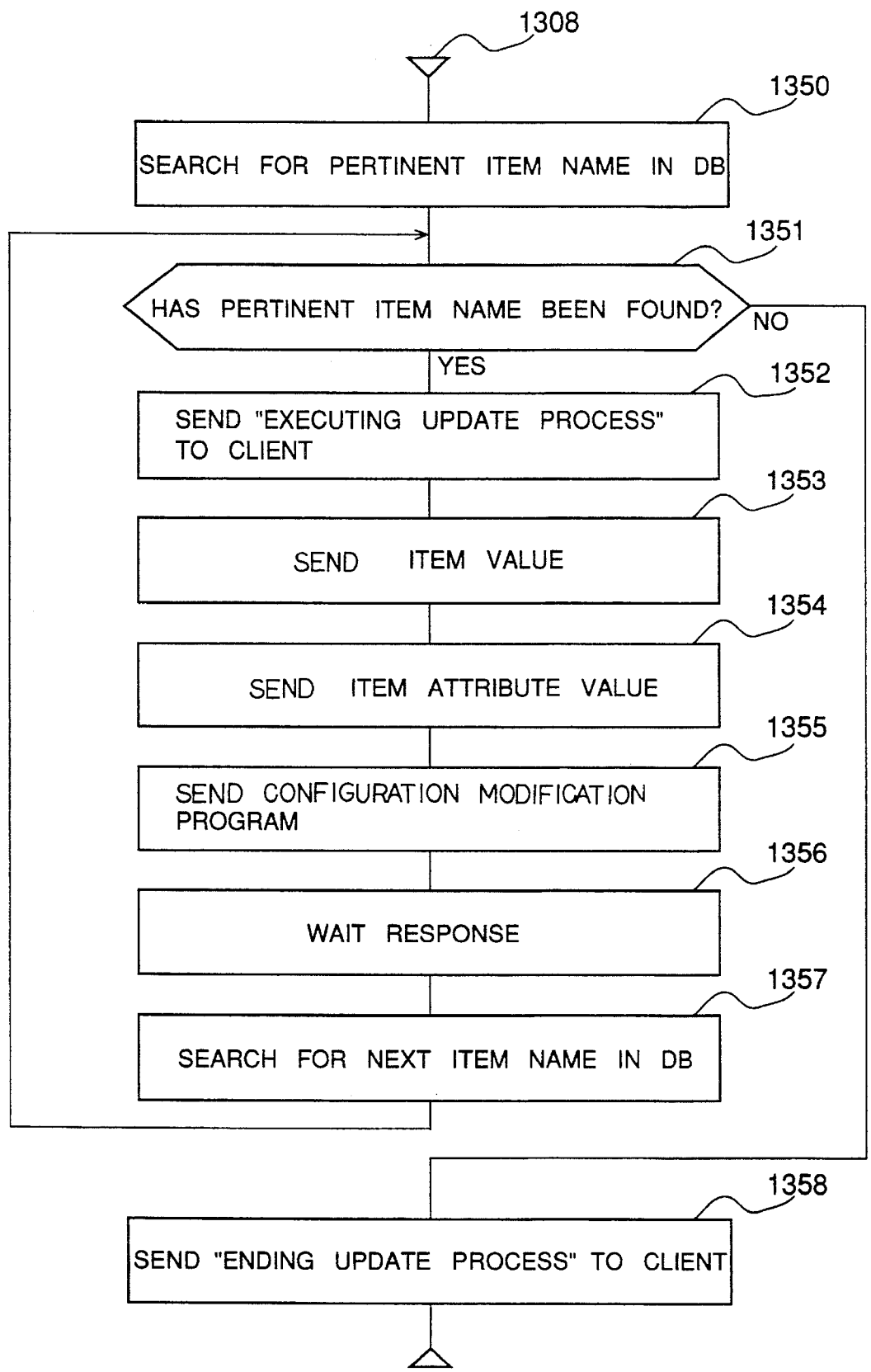
FIG. 21 is a flow chart showing a server-side configuration update process which is contained in the responder.

FIG. 21 is the flow chart of the server-side configuration update procedure 1308. In this server-side configuration update procedure 1308, that entry of the equipment status database 30 whose client type field 3010 has the same value as that of the client type of the client 1020 sent at the connection request is searched for at a step 1350. Subsequently, the result of the search is decided at a step 1351. Herein, in a case where the pertinent entry has not been found, the routine proceeds to a step 1358.

On the other hand, in a case where the pertinent entry has been found, the routine proceeds to a step 1352, at which a message "executing update process" is sent to the client 1020. Thereafter, the value of the item value field 3030 is sent to the client 1020 at a step 1353. This value is received at the step 2353 on the client side as explained before. Subsequently, the value of the item attribute field 3040 of the found entry is sent to the client 1020 at a step 1354. This value is received at the step 2354 on the client side as explained before. At the next step 1355, the configuration modification program 50 is sent to the client 1020. The value of this program is received at the step 2355 on the client side as explained before.

The configuration modification program 50 to be sent is obtained by the following method: The equipment modification procedure database 40 is searched using as keywords the value of the item name field 3020 of the found entry stored in the equipment status database 30 and the value of the client type sent from the client 1020. Herein, when the values of the client type and the field 3020 agree with the values of the client type field 4010 and item name field 4020 at any entry, respectively, the value of the procedure name field 4030 of the entry is the configuration modification program 50.

Referring to FIG. 21 again, the responder 13 awaits a response from the client 1020 at a step 1356. Upon receiving the message "update process completed" sent at the step 2357 by the client 1020, the routine proceeds to a step 1357. Here, the equipment status database 30 is searched for the next entry whose client type field 3010 has the same value as the sent value. Thereafter, the routine returns to the step 1351 so as to continue the processing which conforms to the result of the search. Incidentally, at the step 1358 in the case where no entry has been found as the result of the search, a message "ending update process" is sent to the client 1020. Then, the server-side configuration update procedure 1308 is ended.

Next, the processing contents of the configuration modification program 50 will be explained.

Figure 2:
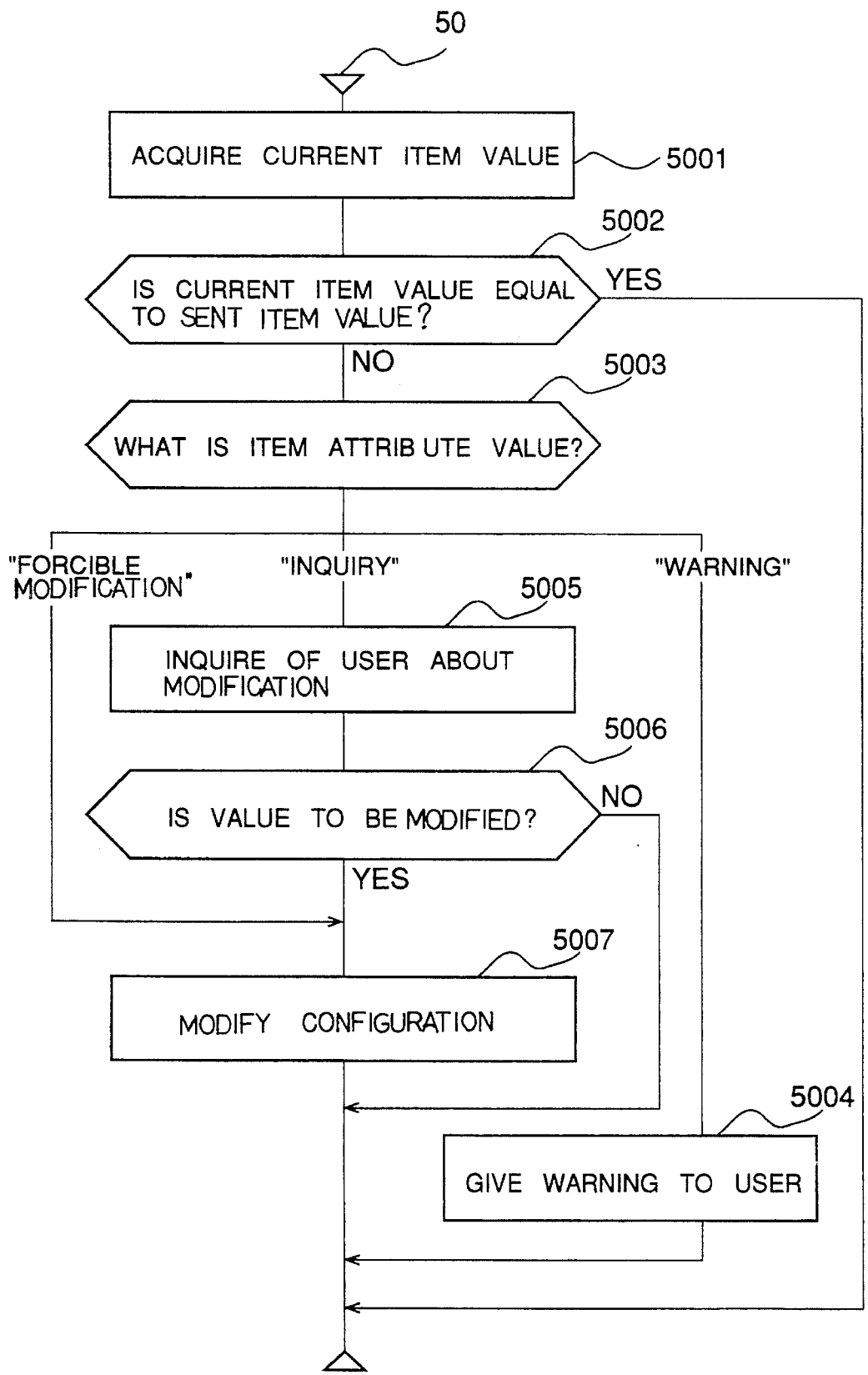
FIG. 2 is a flow chart of a configuration modification program which is stored in the second embodiment.

FIG. 2 is the flow chart of the configuration modification program 50. In this configuration modification program 50, the current value of a configuration item is acquired at a step 5001. The value is acquired in such a way that an inquiry is made by issuing a system call to the client OS 22. At the next step 5002, the current value is compared with an item value delivered as a parameter. Herein, when both the values agree, no modification is required, and hence, the configuration modification program 50 is ended directly.

On the other hand, when both the values do not agree, the routine proceeds to a step 5003, at which an item attribute value delivered as a parameter is checked. The routine proceeds to a step 5007 when the value indicates a "forcible modification"; to a step 5005 when the value indicates an "inquiry"; and to a step 5004 when the value indicates a "warning".

At the step 5004 for the warning, a warning message which states the discrepancy of the item value is displayed for the user, and the configuration modification program 50 is ended without modifying the value.

At the step 5005 for the inquiry, whether or not the item value is to be modified is inquired of the user, and a reply from the user is awaited. Upon receiving the user's reply, the program 50 proceeds to a step 5006, at which the content of the reply is checked. In a case where the user has replied that the item value is not to be modified, the configuration modification program 50 is ended directly. On the other hand, in a case where the user has replied that the item value is to be modified, the routine proceeds to the step 5007 so as to modify the content of the configuration control file 24, whereupon the configuration modification program 50 is ended.

In the case of the forcible modification, the content of the configuration control file 24 is modified at the step 5007, whereupon the configuration modification program 50 is ended. The modification is effected in such a way that the character string of the file content is rewritten as in an ordinary text edit process.

The configuration modification program 50 is the program which is executed in the client 1020. Therefore, such programs are different for the respective client types even if their logical processing flows are the same. In addition, the acquisition of the current value at the step 5001 and the modification of the item value at the step 5007 can have different concrete processing methods for the respective items. Therefore, the configuration modification program 50 is permitted to modify any configuration item of any client in such a way that the program (procedure name 4030) registered in correspondence with the client type 4010 and the item name 4020 within the equipment modification procedure database 40 is transferred to the client 1020 and is executed therein.

Incidentally, although the requester 23 and the configuration modification program 50 are separate in the above embodiment, the client may well be so constructed that the requester contains the configuration modification program.

Here, practicable examples of the "forcible modification", "inquiry" and "warning" will be explained Let's consider a case of utilizing "NetWare" (which is the registered trademark of Novell Inc.) as the server OS 12, and "MS-DOS" (which is the registered trademark of Microsoft Inc.) as the client OS 22. In this case, the configuration control file 24 of the client 1020 becomes a file entitled "CONFIG.SYS".

(1) Forcible Modification:

An item name "LASTDRIVE" contained in the file "CONFIG. SYS" indicates an item for controlling what a shared disk in the server 1010 is entitled in the client 1020.

Regarding programs which access the server 1010, it is essentially assumed that the item has a specified value. When the value is not met, a large number of programs fail to properly access the server 1010. Therefore, the forcible modification needs to be done in order that the value may be always held constant in the clients 1020.

(2) Inquiry:

An item name "FILES" contained in the file "CONFIG-.SYS" indicates an item for controlling the largest number of files to which the client 1020 is accessible at the same time.

The value of the item should desirably be at least a certain fixed value (usually, a value of 30 is recommended). However, even if the item value is less than the recommendation, no special abnormality is incurred in operation when the number of programs to be used is limited. Therefore, whether or not the item value is to be really modified is inquired of the user.

(3) Warning:

An item name "BUFFERS" contained in the file "CONFIG.SYS" indicates an item for designating the number of buffers in the case where the client 1020 accesses a local disk.

The buffers are not used at all when the client 1020 accesses the server 1010. Therefore, in a case where the local disk is used very infrequently, increase in the value of the item turns out only the wasteful use of a memory. Accordingly, when the item value is greater than a predetermined value, warning is given. The mere warning is satisfactory for the reason that, when the memory of the client 1020 has a sufficient capacity, the large value of the item does not pose any drawback.

As thus far described, in the second embodiment of the present invention, when the requester 23 stored in the client 1020 is to be connected to the server 1010, the history of the configuration control file 24 stored in the client 1020 is stored in the configuration history database 60 stored in the server 1010, and the content of the configuration control file 24 stored in the client 1020 is automatically updated in accordance with the content of the equipment status database 30 stored in the server 1010, so as to bring the equipment configuration of the client 1020 into agreement with a configuration stipulated in the server 1010. Therefore, the configurations of the individual clients 1020 can be held constant at any time without troubling the users of these clients. Thus, the erroneous operations of the users are reduced, and the burden of the network manager is relieved.

Moreover, since the history of the configuration control file 24 stored in the client 1020 is automatically stored in the configuration history database 60 stored in the server 1010. Therefore, the contents of the configuration control files 24 stored in all the clients 1020 can be reproduced at any desired time, and it is facilitated to clear up a cause upon the occurrence of any fault.

According to the present invention, the following effects are attained:

It is possible to provide an information processing system in which update processes are automated in conformity with the types of clients, whereby manual version update processes are dispensed with, and in which redirectors of identical versions are run within the system at any time, whereby any error ascribable to different programs is prevented from occurring.

Further, it is possible to provide an information processing system in which local management information items stored in clients are also updated automatically in accordance with information stored in a server, so that any malfunction ascribable to the different environments of the individual clients is prevented from occurring.

Moreover, it is possible to provide an information processing system in which the history of the local management information items of individual clients is stored in a server, so that the management information items can be reproduced at any desired time, thereby making it easy to take a measure against any fault.

What is claimed is:

1. An information processing system having a plurality of equipments which are processing equipments, said information processing system comprising:

a first equipment for providing a resource to any other equipments in the system and for storing information to be supplied to said any other equipments;

a second equipment for utilizing the resource supplied by said first equipment and for receiving said information supplied by said first equipment;

said information including a program and version information thereof, said program being provided according to a type of said second equipment and used by said second equipment for determining whether an access request created in said second equipment is for accessing a local resource of said second equipment or for accessing said resource of said first equipment, and for processing said access request, which is to be transmitted from said second equipment to said first equipment, so that said resource of said first equipment may be utilized by said second equipment;

said second equipment including a first storage for storing a program equivalent to said program and version information thereof;

said program resident in said second equipment transmitting, before determining whether an access request created in said second equipment is for accessing said local resource of said second equipment or for accessing said resource of said first equipment, said version information stored in said first storage to said first equipment, said first equipment comprising:
 a second storage for storing said program to be supplied to said second equipment according to said type of said second equipment, and said version information of said program; and
 comparing means for comparing the version of said program stored in said second storage means with the version of said program transmitted from said second equipment according to said type of said second equipment and transferring, when it is determined by said comparing means that the version of said program stored in said second storage is newer than the version of said program transmitted from said second equipment, said program and said version information stored in said second storage to said second equipment, said program resident in said second equipment replacing itself with a newer version of said program transferred from said first equipment.

2. An information processing system according to claim 1, wherein said first equipment is a server equipment and said second equipment is a client equipment.

3. An information processing system comprising:

a server equipment for providing a resource to any other equipments; and a client equipment which utilizes said resource provided by said server equipment;

said client equipment having a program functioning as a redirector for processing an access request to be transmitted from said client equipment to said server equipment so that said resource of said server equipment may be utilized by said client equipment, wherein said program functioning as said redirector transmits version information of said program to said server equipment before accessing said resource of said server equipment, said server equipment comprising:
 a configuration management storage for storing a program functioning as said redirector, and version information thereof according to a type of said client equipment, and
 a configuration management means for comparing said version information of said program transmitted from said client equipment functioning as said redirector with said version information of said program stored in said server equipment, according to said type of said client equipment, then transmitting said program stored in said server equipment to said client equipment if said version information stored in said server equipment is newer than that transmitted from said client equipment, said program resident in said client equipment replacing itself with said program transmitted from said server.

4. An information processing system having a plurality of equipments which are processing equipments, said information processing system comprising:

a first equipment having information to be supplied to any other equipments in the system;

a second equipment to which said information is provided by said first equipment, said second equipment being usable independently of said first equipment without being connected with first equipment;

said information including predetermined configuration information as to configuration of said second equipment required for accessing said first equipment from said second equipment, and a correction program having a function to correct configuration information of second equipment, said second equipment comprising:
 a first storage for storing said configuration information defined for said second equipment and said correction program transmitted from said first equipment, and
 a request means for requesting a connection to said first equipment for accessing the same, said first equipment comprising:
a second storage means for storing said predetermined configuration information and said correction program to be supplied to said second equipment, said correction program, transmitted from said first equipment and now resident in said first storage in said second equipment, comparing said predetermined configuration information transmitted from said first equipment with that stored in said first storage and correcting said configuration information stored in said first storage such that said configuration information stored in said first storage matches said predetermined configuration information, when it is determined based on a result of the comparison that said configuration information stored in said first storage means is different from said predetermined configuration information.

5. An information processing system according to claim 4, further comprising:

said request means transmitting update-time information indicative of a latest updated time of said configuration information of said second equipment stored in said first storage, and updated configuration information, to said first equipment, said first equipment comprising:

a history storage for storing therein updated configuration information of said second equipment, as history information of said second equipment, together with update-times of said updated configuration information;

determination means for determining whether the configuration of said second equipment is updated or not, based on said update-time information transmitted from said request means, and also based on latest update-time information of said second equipment, stored in said history storage in said first equipment; and said history storage additionally storing therein said update-time information and associated updated configuration information transmitted from said request means when said determination means determines that the configuration of said second equipment has been updated.

6. An information processing system according to claim 4, wherein said first equipment is a server equipment and said second equipment is a client equipment, and said request means for requesting a connection to said first equipment is a requester which requests a connection to said server equipment and transmits said update-time information and associated updated configuration information to said server equipment and said determination means is a responder.

7. An information processing system according to claim 4, wherein said predetermined configuration information includes a plurality of items of configuration, and wherein a plurality of correction programs are provided, as said correction program, for correcting said items.

8. An information processing system according to claim 7, wherein said predetermined configuration information further includes attribute information for each of said items, said attribute information for each item defining ways of correcting said item, including at least two of:

(a) unconditionally correcting said item, (b) correcting said item when instructed by a user responsive to an inquiry of said user, and (c) merely warning said user.

* * * * *